(12) United States Patent
Abramoski et al.

(10) Patent No.: US 10,343,641 B2
(45) Date of Patent: Jul. 9, 2019

(54) VEHICLE AIRBAG

(71) Applicant: Ford Global Technologies, LLC, Dearborn, MI (US)

(72) Inventors: Edward Joseph Abramoski, Canton, MI (US); Imen Guediche, Ann Arbor, MI (US); Rahul Makwana, Dearborn Heights, MI (US); Eric Axel Smitterberg, Berkley, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/488,600

(22) Filed: Apr. 17, 2017

(65) Prior Publication Data

US 2018/0297548 A1    Oct. 18, 2018

(51) Int. Cl.
| | | |
|---|---|---|
| *B60R 21/233* | (2006.01) | |
| *B60R 21/231* | (2011.01) | |
| *B60R 21/205* | (2011.01) | |
| *B60R 21/00* | (2006.01) | |
| *B60R 21/2338* | (2011.01) | |
| *B60R 21/235* | (2006.01) | |

(52) U.S. Cl.
CPC .......... *B60R 21/231* (2013.01); *B60R 21/233* (2013.01); *B60R 21/2338* (2013.01); *B60R 21/205* (2013.01); *B60R 2021/0032* (2013.01); *B60R 2021/23308* (2013.01); *B60R 2021/23382* (2013.01); *B60R 2021/23509* (2013.01)

(58) Field of Classification Search
CPC . B60R 21/231; B60R 21/2338; B60R 21/205; B60R 2021/23382; B60R 2021/23509
See application file for complete search history.

(56) References Cited

U.S. PATENT DOCUMENTS

| | | | | |
|---|---|---|---|---|
| 3,476,402 A | * | 11/1969 | Wilfert | ................. B60R 21/233 280/729 |
| 3,752,501 A | * | 8/1973 | Daniel | ................. B60R 21/233 280/729 |
| 5,253,892 A | * | 10/1993 | Satoh | ................... B60R 21/233 280/731 |
| 5,609,363 A | | 3/1997 | Finelli | |

(Continued)

FOREIGN PATENT DOCUMENTS

| | | |
|---|---|---|
| DE | 10311006 B4 | 10/2009 |
| GB | 2340458 A | 2/2000 |

(Continued)

OTHER PUBLICATIONS

GB Search Report dated Sep. 17, 2018 re GB Appl. 1805928.7.

*Primary Examiner* — Faye M Fleming
(74) *Attorney, Agent, or Firm* — Frank A. MacKenzie; Bejin Bieneman PLC (57) ABSTRACT

An airbag includes a main panel. The main panel defines an inflation chamber and is inflatable to an inflated position. The airbag includes a pair of extensions spaced from each other. Each extension has a perimeter surface, and the entire perimeter surface extends transversely to the main panel on the perimeter of the extension. The airbag includes an impact panel spaced from the main panel in the inflated position, and the impact panel extends from one of the extensions to the other of the extensions.

19 Claims, 6 Drawing Sheets

(56) References Cited

U.S. PATENT DOCUMENTS

| | | | |
|---|---|---|---|
| 6,254,121 B1* | 7/2001 | Fowler | B60R 21/233 |
| | | | 280/729 |
| 6,419,262 B1* | 7/2002 | Fendt | B60R 21/231 |
| | | | 280/729 |
| 6,913,283 B2 | 7/2005 | Heym | |
| 6,962,363 B2 | 11/2005 | Wang et al. | |
| 7,137,647 B2 | 11/2006 | Adomeit | |
| 7,360,790 B2 | 4/2008 | Hasebe et al. | |
| 7,434,831 B2 | 10/2008 | Noguchi et al. | |
| 7,540,534 B2 | 6/2009 | Hasebe et al. | |
| 7,661,700 B2 | 2/2010 | Imamura et al. | |
| 7,673,901 B2* | 3/2010 | Hanawa | B60R 21/233 |
| | | | 280/729 |
| 7,926,840 B1 | 4/2011 | Choi | |
| 7,942,443 B2 | 5/2011 | Dennis et al. | |
| 7,992,897 B2 | 8/2011 | Sekino et al. | |
| 8,328,228 B2 | 12/2012 | Lee et al. | |
| 8,876,153 B2* | 11/2014 | Dix | B60R 21/233 |
| | | | 280/729 |
| 9,157,173 B2* | 10/2015 | Westoby | D01D 5/426 |
| 9,205,798 B1 | 12/2015 | Jindal et al. | |
| 9,573,555 B2* | 2/2017 | Jang | B60R 21/233 |
| 9,676,355 B2* | 6/2017 | Kruse | B60R 21/0136 |
| 9,694,782 B2* | 7/2017 | Nagatani | B60R 21/203 |
| 9,738,243 B2* | 8/2017 | Fukawatase | B60R 21/233 |
| 2006/0237953 A1 | 10/2006 | Abe | |
| 2012/0193896 A1 | 8/2012 | Turnbull et al. | |
| 2015/0258958 A1 | 9/2015 | Belwafa et al. | |
| 2016/0068131 A1 | 3/2016 | Komatsu et al. | |
| 2016/0250993 A1 | 9/2016 | Nagatani et al. | |
| 2016/0311392 A1 | 10/2016 | Jindal et al. | |
| 2017/0057453 A1 | 3/2017 | Morris et al. | |

FOREIGN PATENT DOCUMENTS

| | | |
|---|---|---|
| JP | 2008044480 A | 2/2008 |
| JP | 2008184149 A | 8/2008 |
| JP | 20096924 A | 1/2009 |
| JP | 4678265 B2 | 2/2011 |
| JP | 2012121572 A | 6/2012 |
| JP | 2016016730 A | 2/2016 |

* cited by examiner

VEHICLE AIRBAG

BACKGROUND

Vehicles may include a variety of airbags deployable during vehicle impacts to absorb energy from occupants of the vehicles during the impact. The airbag may be a component of an airbag assembly including a housing supporting the airbag, and an inflation device in communication with the airbag for inflating the airbag from an uninflated position to an inflated position. The airbag assemblies may be supported on a steering wheel of the vehicle, an instrument panel of the vehicle, a headliner of the vehicle, etc.

DETAILED DESCRIPTION

An airbag includes a main panel defining an inflation chamber and being inflatable to an inflated position. The airbag includes a pair of extensions spaced from each other. Each extension has a perimeter surface. The entire perimeter surface extends transversely to the main panel on the perimeter of the extension. The airbag includes an impact panel spaced from the main panel in the inflated position and extending from one of the extensions to the other of the extensions.

The extensions have distal ends spaced from the main panel, and the impact panel may extend from the distal end of one of the extensions to the distal end of the other of the extensions.

One of the perimeter surfaces has a first portion and the other of the perimeter surfaces has a second portion, the first portion and the second portion may face each other, and the impact panel may extend from the first portion to the second portion.

One of the perimeter surfaces has a first portion and the other of the perimeter surfaces has a second portion. The first portion and the second portion may face each other, and a length of the impact panel may be greater than a distance from the first portion to the second portion.

The impact panel may have a coefficient of friction that is different than a coefficient of friction of the main panel. The impact panel and the main panel may each be a fabric each having a weave pattern. The coefficients of friction of the impact panel and the main panel may be defined by at least the weave patterns of the fabrics. The weave pattern of the fabric of the impact panel may be different than the weave pattern of the fabric of the main panel.

The airbag may include a first tether and a second tether each in the inflation chamber. The first tether may be connected to one of the extensions, and the second tether may be connected to the other of the extensions.

A diameter of each extension through the perimeter surface may be less than a diameter of the main panel.

Each extension may extend between and terminate at an upper end and a lower end. The impact panel may extend continuously from the upper end to the lower end.

Each extension may be in fluid communication with the inflation chamber.

An airbag assembly includes a housing and an airbag supported by the housing. The airbag includes a main panel defining an inflation chamber being inflatable to an inflated position. The airbag includes a pair of extensions spaced from each other. Each extension has a perimeter surface. The entire perimeter surface extends transversely to the main panel on the perimeter of the extension. The airbag includes an impact panel spaced from the main panel in the inflated position and extending from one of the extensions to the other of the extensions. The airbag includes an inflator in communication with the inflation chamber.

The extensions may have distal ends spaced from the main panel. The impact panel may extend from the distal end of one of the extensions to the distal end of the other of the extensions.

One of the perimeter surfaces has a first portion and the other of the perimeter surfaces has a second portion. The first portion and the second portion facing each other, and the impact panel may extend from the first portion to the second portion.

One of the perimeter surfaces has a first portion and the other of the perimeter surfaces has a second portion. The first portion and the second portion face each other. A length of the impact panel may be greater than a distance from the first portion to the second portion.

The impact panel may have a coefficient of friction that is different than a coefficient of friction of the main panel. The impact panel and the main panel may each be a fabric. The fabric of the impact panel may have a weave pattern and the coefficient of friction of the impact panel may be defined by at least the weave pattern. The fabric of the main panel may have a weave pattern different than the weave pattern of the impact panel.

The airbag assembly may include a first tether and a second tether each in the inflation chamber. The first tether may extend from the housing to one of the extensions and the second tether extending from the housing to the other of the extensions.

The airbag may extend in a first direction from the housing to the main panel and the extensions may extend from the main panel in the first direction.

A diameter of extension through the perimeter surface may be less than a diameter of the main panel.

Each extension may extend between and terminate at an upper end and a lower end, and the impact panel may extend continuously from the upper end to the lower end.

With reference to the Figures, wherein like numerals indicate like parts throughout the several views, an airbag 16 includes a main panel 18. The main panel 18 defines an inflation chamber 20 and is inflatable to an inflated position. The airbag 16 includes a pair of extensions 24, 26 spaced from each other. Each extension 24, 26 has a perimeter surface 28, 30, and the entire perimeter surface 28, 30 extends transversely to the main panel 18 on the perimeter of the extension 24, 26. The airbag 16 includes an impact panel 56 spaced from the main panel 18 in the inflated position, and the impact panel 56 extends from one of the extensions 24, 26 to the other of the extensions 24, 26.

Several organizations release vehicle impact test procedures and standards for vehicles. For example, the Insurance Institute for Highway Safety (IIHS) has a proposed standardized measurement for brain injury criterion (BrIC) to assess brain injury risk in vehicle impact tests. The New Car Assessment Program (NCAP) from the National Highway Traffic Safety Administration (NHTSA) also includes BrIC. The BrIC is benefited from low rotation of the occupant's head, e.g., the head of a test dummy 84. Rotation of the occupant's head can occur, e.g., from side impact events, frontal oblique impact events, etc. As another example, head rotation of the test dummy 84 can occur during small overlap rigid barrier (SORB) tests. The SORB test is standardized by the IIHS. In the SORB test, a rigid barrier overlaps a driver side of the vehicle by 25% of a vehicle's front end at an initial speed of 40 mph. The BrIC is a function of the maximum pitch, roll, and yaw of the head of the test dummy 84 during the test, specifically, $$BrIC = \sqrt{\left(\frac{\omega_x}{66.25 \text{ rad}}\right)^2 + \left(\frac{\omega_y}{56.45 \text{ rad}}\right)^2 + \left(\frac{\omega_z}{42.87 \text{ rad}}\right)^2},$$

in which $\omega_x$ is the maximum roll, $\omega_y$ is the maximum pitch, and co, is the maximum yaw, all measured in radians per second. During a vehicle impact event, e.g., SORB test, side impact, frontal oblique impact, etc., when the head of the test dummy 84 contacts the airbag 16 and starts rotating, the extensions 24, 26 slow down the head's rotation. Additionally, the impact panel 56 receives the head, and, as the head pushes down on the impact panel 56, the impact panel 56 pulls the extensions 24, 26 towards each other, causing the extensions 24, 26 to wrap around the head of the test dummy 84. This offers better containment of the head, thus, reducing head rotation relative to the airbag 16 and lowering the BrIC value.

Figure 1:
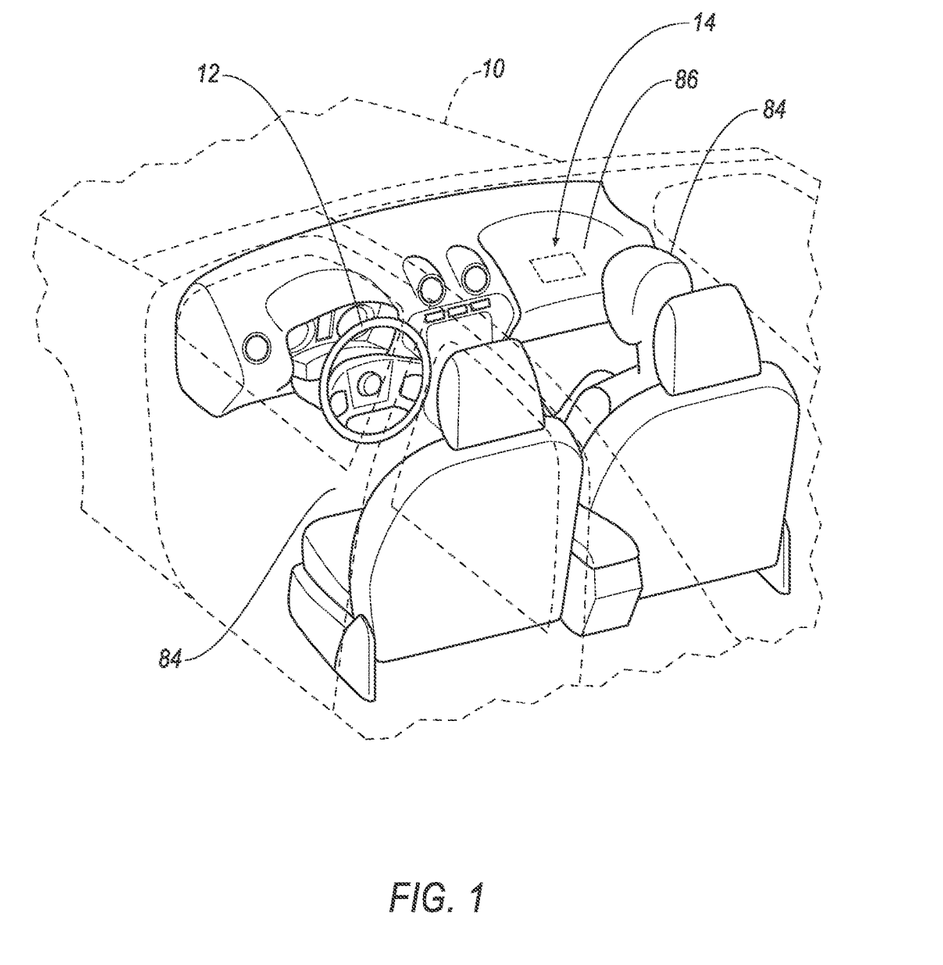
FIG. 1 is a perspective view of a vehicle including an airbag assembly supported by an instrument panel with an airbag of the airbag assembly in an uninflated position.
Figure 2:
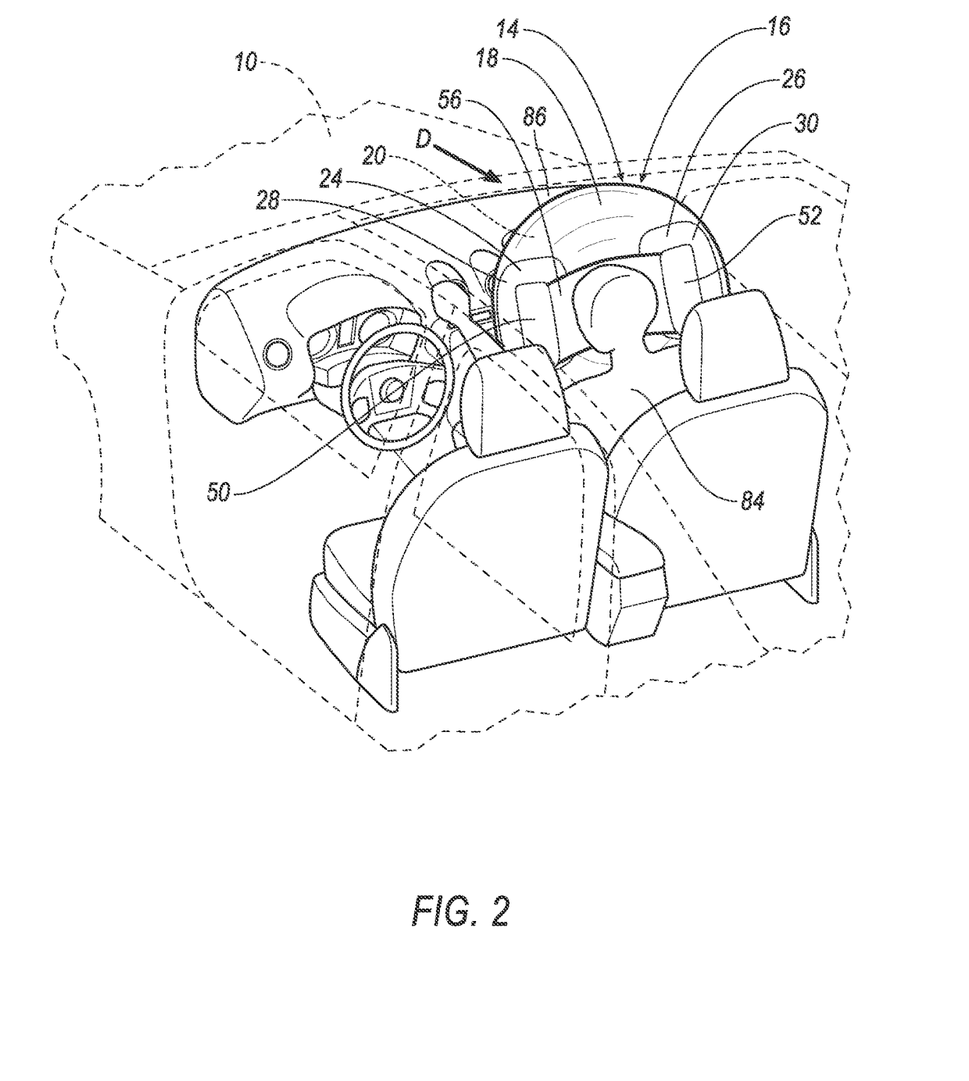
FIG. 2 is a perspective view of the vehicle including the airbag in an inflated position.

With reference to FIGS. 1 and 2, a vehicle 10 includes a steering wheel 12, an instrument panel 86, and an airbag assembly 14, i.e., an airbag module. The airbag assembly 14 may be supported by, for example, the instrument panel 86, as shown in FIGS. 1 and 2. As other examples, the airbag assembly 14 may be supported by the steering wheel 12, a seat back (not numbered), etc. As shown in FIGS. 1 and 2, for example, the airbag assembly 14 is shown as a front passenger airbag assembly. As another example, the airbag assembly 14 may be, for example, a driver airbag assembly, a rear airbag assembly, or any other suitable configuration. The vehicle 10 may be, for example, any type of passenger automobile.

The airbag assembly 14 may include a housing 72, the airbag 16 supported by the housing 72, and an inflator 76 in communication with the inflation chamber 20. The inflator 76 and the airbag 16 may be disposed in the housing 72 in an uninflated position, e.g., the housing 72 may define a cavity that houses the airbag 16 and the inflator 76 in the uninflated position. The housing 72 provides a reaction surface for the airbag 16 in the inflated position. The housing 72 may be supported by, for example, the steering wheel 12, the instrument panel 86, the headliner, etc. The housing 72 may be formed of any material, e.g., a rigid polymer, a metal, a composite, etc.

The airbag 16, including the main panel 18, the pair of extensions 24, 26, and the impact panel 56, may be formed of a woven polymer or any other material. As one example, the airbag 16 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

With reference to FIGS. 2-5, the airbag 16 includes the main panel 18. In the inflated position, the main panel 18 may be, for example, a bulbous shape, a spherical shape, a rectangular shape, or any other suitable shape. The main panel 18 defines the inflation chamber 20. Specifically, the main panel 18 extends around the inflation chamber 20. The main panel 18 has multiple sides that extend from the housing 72 in a vehicle-rearward direction and extend in a generally vertical direction in front of the occupant, and the sides of the main panel 18 extend around the inflation chamber 20. The main panel 18 may be a single sheet of material or may be multiple sheets of material connected together, e.g., by stitching.

The main panel 18, specifically, includes a front face 88 that faces the occupant when the airbag 16 is inflated. The front face 88 is disposed between the housing 72 and the impact panel 56 when the airbag 16 is inflated. The rest of the main panel 18 extends from the front face 88 toward the housing 72, i.e., the main panel 18 changes direction from the front face 88 toward the housing 72. The front face 88 may be generally flat, i.e., is flat or includes a slight curve resulting from the inflation of the airbag and the pliable material type of the main panel 18.

With continued reference to FIGS. 2-5, the airbag 16 includes the pair of extensions 24, 26. As set forth above, each extension 24, 26 has a perimeter surface 28, 30, and the entire perimeter surface 28, 30 extends transversely to the main panel 18 on the perimeter of the extension 24, 26. Specifically each extension 24, 26 extends from the front face 88. In particular, the perimeter surface 28, 30 of the extensions 24, 26 extend from the front face 88. The entire perimeter surface 28, 30 may extend from the front face 88, i.e., the perimeter surfaces 28, 30 may be surrounded by the front face 88 where the extensions 24, 26 extend from the front face 88, as shown in FIGS. 2-5.

The extensions 24, 26 each have a diameter 38, 40 where the perimeter surfaces 28, 30 intersect with the main panel 18. The diameter 38, 40 of each extension 24, 26 through the perimeter surface 28, 30 may be less than a diameter 22 of the main panel 18. The diameter 38, 40 is the longest straight line that extends through the center of the extension 24, 26. The extensions 24, 26 may have any suitable cross-sectional shape, e.g., oval, kidney-shaped, rounded rectangle, circular, trapezoidal, etc.

The extensions 24, 26 may be in fluid communication with the inflation chamber 20. In other words, the inflation chamber 20 may extend into the extensions 24, 26. For example, the inflation chamber 20 may be open to the extensions 24, 26. Alternatively, for example, a vent, e.g., an open vent, a one-way vent, a two-way vent, an active vent, etc., may be disposed in the inflation chamber 20 at the extensions 24, 26 for controlling gas flow into the extensions 24, 26. As another example, the extensions 24, 26 may be separated from the inflation chamber 20, i.e., the extensions 24, 26 may not be in fluid communication with the inflation chamber 20.

In the inflated position, the extensions 24, 26 extend farther outwardly relative to the main panel 18, i.e., in a vehicle-rearward direction. As set forth above, the entire perimeter surfaces 28, 30 of the extensions 24, 26 extend transversely to the main panel 18 on the perimeter of the extensions 24, 26. In other words, the perimeter surfaces 28, 30 are continuous, and the perimeter surfaces 28, 30 extend entirely around and enclose the portion of the inflation chamber 20 that extends into the extensions 24, 26.

As set forth above, the perimeter surfaces 28, 30 extend transversely from the main panel 18. In other words, the perimeter surfaces 28, 30 extend along a plane in which the main panel 18 extends at the extensions 24, 26. The perimeter surfaces 28, 30 may extend at a right angle, i.e., 90 degrees, relative to the main panel 18. A transition from the perimeter surfaces 28, 30 to the main panel 18 may be angular or may be rounded.

The extensions 24, 26 have distal ends 50, 52 spaced from the main panel 18. The distal ends 50, 52 may be flat as shown in FIGS. 2-5, or may be rounded. The extensions 24, 26 may have an identical size and shape, as shown in FIGS. 2-5. Alternatively, the extensions 24, 26 may be shaped differently from each other.

Figure 3:
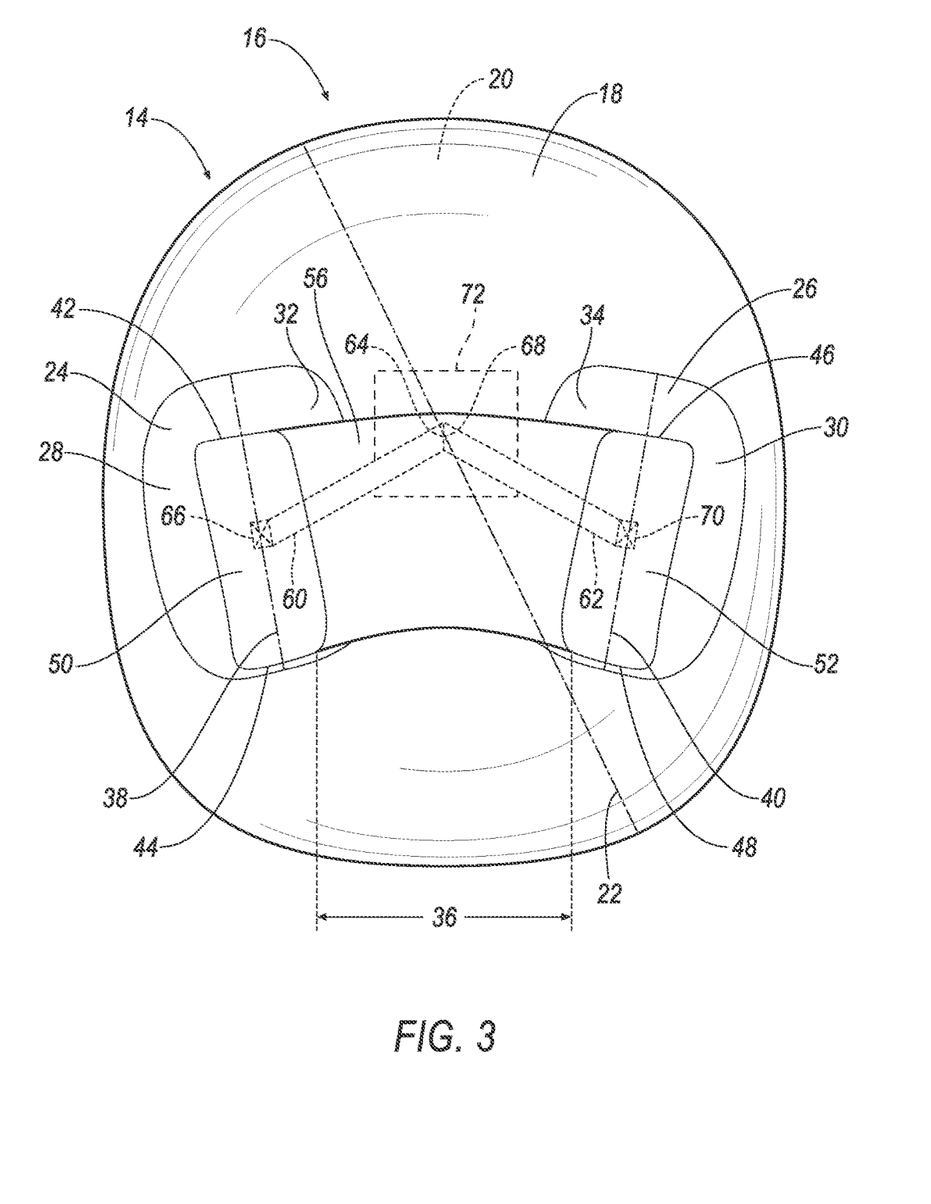
FIG. 3 is a perspective view of the airbag in the inflated position.
Figure 4:
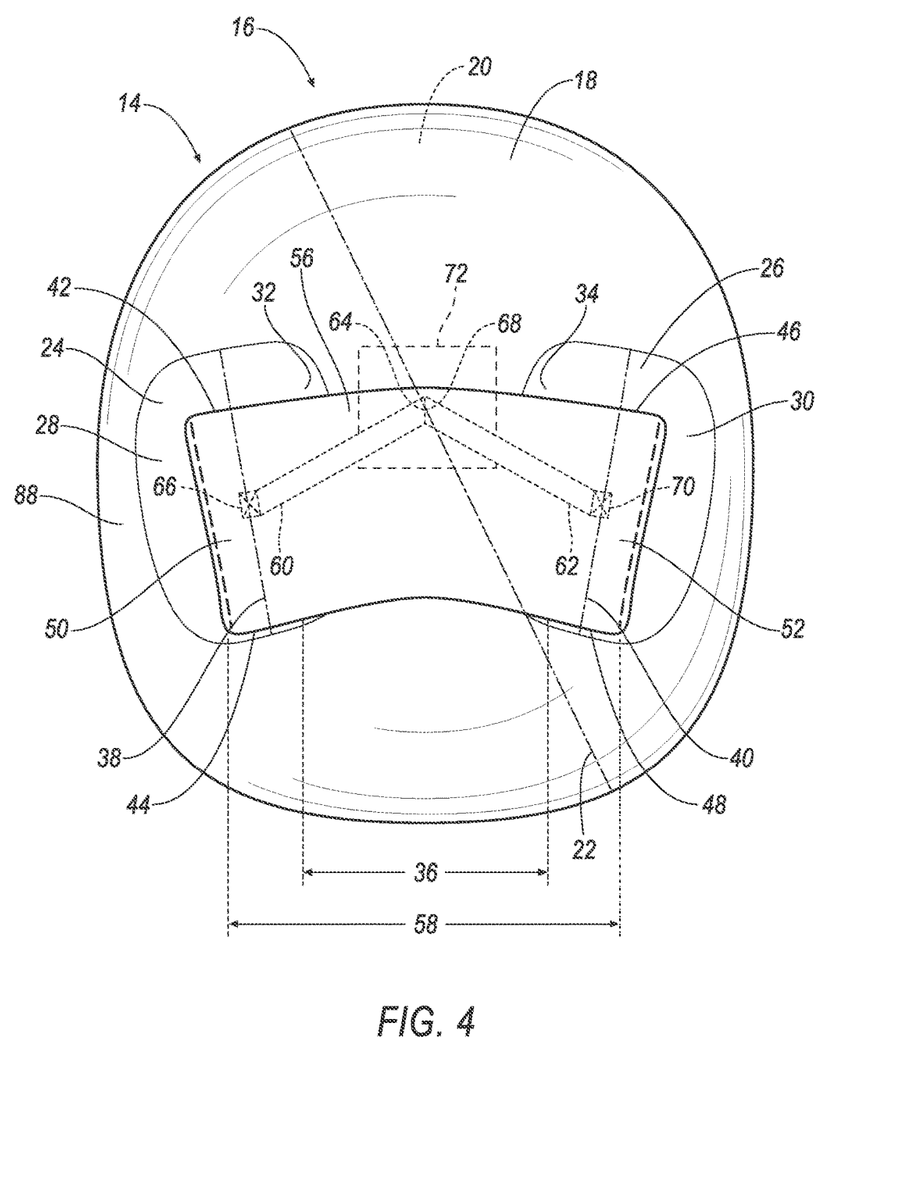
FIG. 4 is a perspective view of another embodiment of the airbag in the inflated position.
Figure 5:
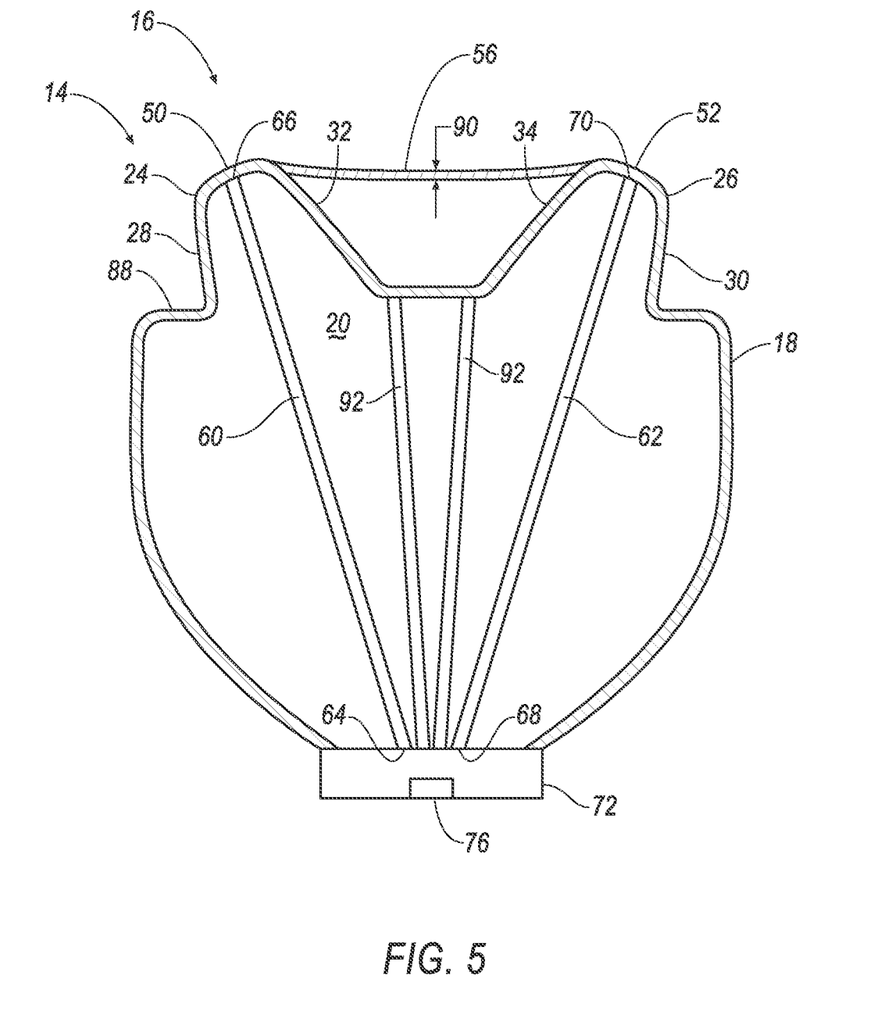
FIG. 5 is a cross-section view of the airbag assembly with the airbag in the inflated position.

With reference to FIGS. 3-5, the airbag 16 may include a first tether 60 and a second tether 62 each in the inflation chamber 20. The first tether 60 is connected to one of the extensions 24, and the second tether 62 is connected to the other of the extensions 26. The first tether 60 may extend from the housing 72 to one of the extensions 24, and the second tether 62 may extend from the housing 72 to the other of the extensions 26. In addition to, or in the alternative to the first and second tethers 60, 62, the airbag 16 may include two central tethers 92 extending from the housing 72 to the front face 88. Alternatively, the two central tethers 92 may extend from, for example, the instrument panel 86, the steering wheel 12, a steering column, etc., to the front face 88. The first tether 60, the second tether 62, and the two central tethers 92 may be formed of the same type of material as the airbag 16 or from any other suitable type of material.

The first tether 60 may extend from a first end 64 to a second end 66, and the second tether 62 may extend from a first end 68 to a second end 70. For example, the first end 64 of the first tether 60 and the first end 68 of the second tether 62 may be connected to the housing 72. Alternatively, the first end 64 of the first tether 60 and the first end 68 of the second tether 62 may be connected to, for example, the instrument panel 86, the steering wheel 12, the steering column, etc. The first end 64 of the first tether 60 and the first end 68 of the second tether 62 may be anchored in any suitable manner, e.g., stitching, fusing, adhesive, integral formation, etc.

The second end 66 of the first tether 60 may be connected to one of the extensions 24 at the distal end 50, and the second end 70 of the second tether 62 may be connected to the other of the extensions 26 at the distal end 52. Alternatively, the second end 66 of the first tether 60 and the second end 70 of the second tether 62 may be connected to the extensions 24, 26 at any suitable location. The second end 66 of the first tether 60 and the second end 70 of the second tether 62 may be connected to the extensions 24, 26 in any suitable manner, e.g., stitching, fusing, adhesive, integral formation, etc.

As one example, the tethers 60, 62 may be configured to remain connected from the housing 72 to the extensions 24, 26 when the airbag 16 is inflated to a first inflation pressure, and to break between the housing 72 and the extensions 24, 26 when the airbag 16 is inflated to a second inflation pressure higher than the first inflation pressure. As another example, the tethers 60, 62 may be configured to remain connected, i.e., not configured to break, from the housing 72 to the extensions 24, 26 throughout the duration of the inflation of the airbag 16.

As set forth above, the airbag 16 includes an impact panel 56 spaced from the main panel 18, i.e., spaced from the front face 88, in the inflated position, as shown in FIG. 5. The impact panel 56 may have any suitable shape such as a generally rectangular shape as shown in FIGS. 2-4, a circular shape, an elliptical shape, etc.

The impact panel 56 may have a coefficient of friction that is different than a coefficient of friction of the main panel 18. The fabric of the impact panel 56 and the fabric of the main panel 18 may be the same fabric or they may be different fabrics. As one example the impact panel 56 and the main panel 18 are each a fabric each having a different weave pattern, and the coefficients of friction of the impact panel 56 and the main panel 18 are defined by at least the weave patterns of the fabrics. As another example, the impact panel 56 and the main panel 18 may be formed of different types of fabrics each having a different coefficient of friction. The coefficient of friction of the impact panel 56 may be greater than the coefficient of friction of the main panel 18 to reduce the likelihood that the head of the occupant slides across the impact panel 56 during impact. As another example, the coefficient of friction of the impact panel 56 may be less than the coefficient of friction of the main panel 18.

As set forth above, the impact panel 56 extends from one of the extensions 24 to the other of the extensions 26. As one example, one of the perimeter surfaces 28 has a first portion 32 and the other of the perimeter surfaces 30 has a second portion 34. The first portion 32 and the second portion 34 face each other, and the impact panel 56 may extend from the first portion 32 to the second portion 34. The first portion 32 and the second portion 34 may extend from the main panel 18 to the distal ends 50, 52 along a height of the perimeter surfaces 28, 30. The impact panel 56 may extend from one of the extensions 24 to the other of the extensions 26 at any height on the first portion 32 and the second portion 34. Additionally, the height at which the impact panel 56 connects to the first portion 32, may be the same or different than the height at which the impact panel 56 connects to the second portion 34.

As another example, the impact panel 56 may extend from the distal end 50 of one of the extensions 24 to the distal end 52 of the other of the extensions 26, as shown in FIGS. 3-5. That is, the height at which the impact panel 56 connects to the first portion 32 and the second portion 34 is the height on the perimeter surfaces 28, 30 furthest from the main panel 18.

As another example shown in FIG. 4, a length 58 of the impact panel 56 may be greater than a distance 36 from the first portion 32 to the second portion 34. As shown in FIG. 4, the impact panel 56 may be connected to the distal ends 50, 52 of the extensions 24, 26, or the impact panel 56 may be connected to the extensions 24, 26 at any suitable location. For example, the impact panel 56 may be connected to the distal ends 50, 52, or to the perimeter surfaces 28, 30 at a location opposite the first portion 32 and the second portion 34.

The impact panel 56 may be connected to the extensions 24, 26 in any suitable manner, e.g., stitching, fusing, adhesive, integral formation, etc. The impact panel 56 may be in fluid communication with the portion of the inflation chamber 20 that extends into the extensions 24, 26, i.e., the impact panel 56 may have an inflatable chamber (not shown). Alternatively, the impact panel 56 may be sealed off from the portion of the inflation chamber 20 that extends into the extensions 24, 26, i.e., the impact panel 56 is a solid, non-hollow member, as shown in FIG. 5.

As shown in FIG. 5, the impact panel 56 may have a thickness 90 that is uniform across the entire impact panel 56, however, it should be understood that the thickness 90 may be uniform or variable. For example, the thickness 90 may be greater at a location between one of the extensions 24 and the other of the extensions 26, i.e., at a location where the impact panel 56 receives the head of the test dummy 84. Alternatively, the thickness 90 may vary in any suitable manner.

Each extension 24, 26 extends between and terminates at an upper end 42, 46 and a lower end 44, 48. For example, the upper end 44, 48 and the lower end 42, 46 may be at locations on the perimeter surfaces 28, 30, or on edges of the perimeter surfaces 28, 30. The impact panel 56 extends continuously from the upper end 42, 46 to the lower end 44, 48. That is, each extension 24, 26 has a length extending from the upper end 42, 46 to the lower end 44, 48, and the impact panel 56 has a width (not numbered) equal to the length from the upper end 42, 46 to the lower end 44, 48. The length from the upper end 42, 46 to the lower end 44, 48 may be equal to, lesser than, or greater than the diameters 38, 40 of each extension 24, 26 through the perimeter surfaces 28, 30. The length from one of the upper ends 42 to one of the lower ends 44 may be equal to, lesser than, or greater than the length from the other of the upper ends 46 to the other of the lower ends 48. The impact panel 56 extends continuously along the length from the upper end 42, 46 to the lower end 44, 48, i.e., the width of the impact panel 56 is unbroken along the length from the upper end 42, 46 to the lower end 44, 48.

Figure 6:
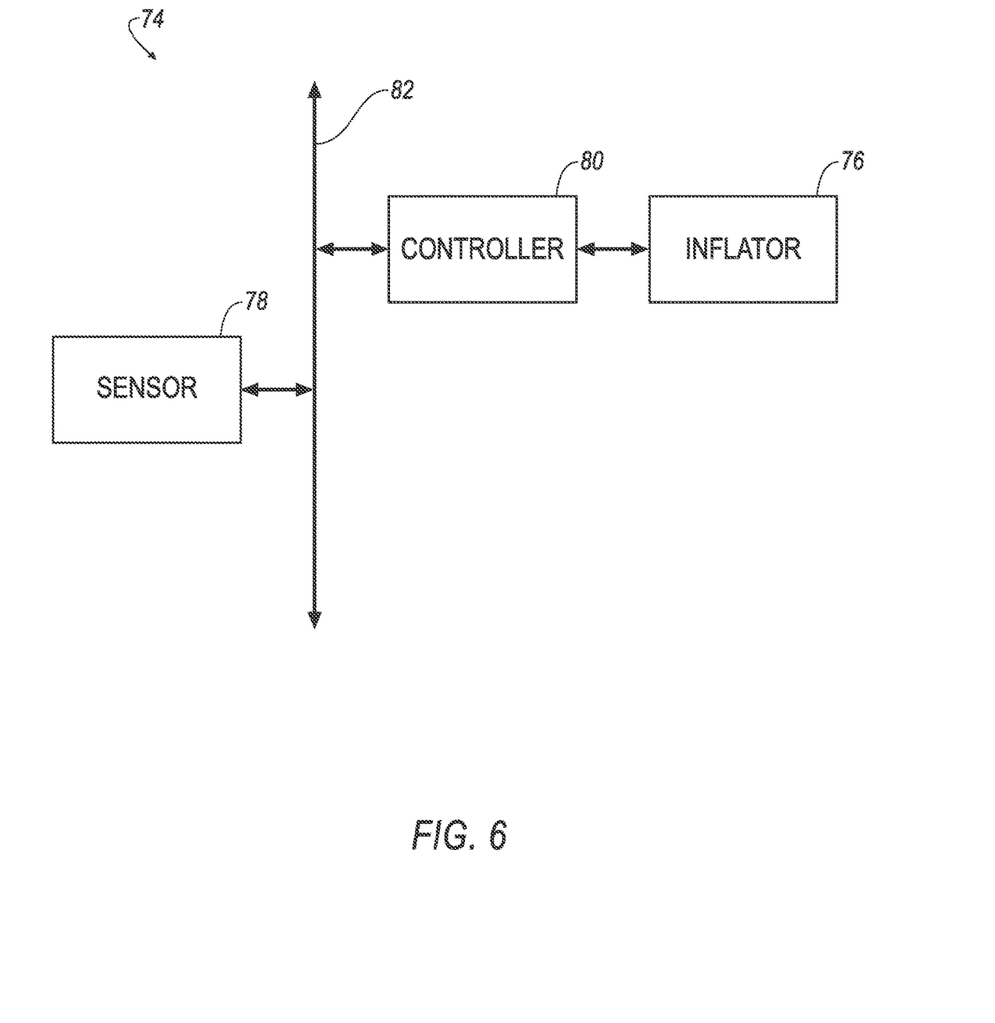
FIG. 6 is a schematic of an impact sensing system of the vehicle.

The vehicle 10 includes an impact sensing system 74, shown schematically in FIG. 6. The impact sensing system 74 may include at least one impact sensor 78 for sensing impact of the vehicle 10, and a controller 80 in communication with the impact sensor 78 and the inflator 76. The controller may activate the inflator 76, e.g., provide an impulse to a pyrotechnic charge of the inflator 76, when the impact sensor 78 senses an impact of the vehicle 10. Alternatively or additionally to sensing impact, the impact sensing system 74 may be configured to sense impact prior to impact, i.e., pre-impact sensing.

The impact sensor 78 may be in communication with the controller 80. The impact sensor 78 is programmed to detect an impact to the vehicle 10. The impact sensor 78 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 78 may be located at numerous points in or on the vehicle 10.

The controller 80 may be a microprocessor-based controller implemented via circuits, chips, or other electronic components. For example, the controller 80 may include a processor, memory, etc. The memory of the controller 80 may include memory for storing instructions executable by the processor as well as for electronically storing data and/or databases.

The inflator 76 is in fluid communication with the airbag 16. Upon receiving a signal from, e.g., the controller 80, the inflator 76 may inflate the airbag 16 with an inflatable medium, such as a gas. The inflator 76 may be, for example, a pyrotechnic inflator that uses a chemical reaction to drive inflation medium to the airbag 16. The inflator 76 may be of any suitable type, for example, a cold-gas inflator.

The controller 80 and the impact sensor 78 may be connected to a communication bus 82, such as a controller area network (CAN) bus, of the vehicle 10. The controller 80 may use information from the communication bus 82 to control the activation of the inflator 76. The inflator 76 may be connected to the controller 80, as shown in FIG. 6, or the inflator 76 may be connected directly to the communication bus 82.

In operation, the airbag 16 is in an uninflated position, as shown in FIG. 1, under normal operating conditions of the vehicle 10. In the event of an impact, the impact sensor 78 may detect the impact and transmit a signal through the communication bus 82 to the controller 80. The controller 80 may transmit a signal through the communication bus 82 to the inflator 76. The inflator 76 may discharge and inflate the airbag 16 with the inflation medium from the uninflated position to the inflated position.

During inflation of the airbag 16, the airbag 16 extends in a first direction D from the housing 72 to the main panel 18, and the extensions 24, 26 extend from the main panel 18 in the first direction D. As shown in FIG. 2, the first direction D may extend generally in a vehicle-rearward direction from the housing 72 to the main panel 18, e.g., in parallel with a longitudinal axis of the vehicle 10. During inflation of the airbag 16, the extensions 24, 26 extend from the main panel 18 in the same direction, i.e., the first direction D, as the airbag 16 extends from the housing 72. The impact panel 56 extends from one of the extensions 24, 26 to the other of the extensions 24, 26 and is spaced from the front face 88. When an occupant impacts the impact panel 56, the impact panel 56 pulls the extensions 24, 26 toward each other and catches the head of the occupant. This motion encourages retention of the head of the occupant on the impact panel 56 and reduces the likelihood of the head of the occupant sliding off the airbag 16. For example, this reaction of the airbag 16 may reduce the likelihood of the head of the occupant sliding off the airbag 16 during an oblique impact in which the occupant is urged in both a forward and cross-vehicle direction.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An airbag comprising:
   a main panel defining an inflation chamber and being inflatable to an inflated position;
   a pair of extensions spaced from each other, each extension having a perimeter surface, the entire perimeter surface extending transversely from the main panel on the perimeter of the extension; and
   an impact panel external to the inflation chamber, the impact panel spaced from the main panel in the inflated position and extending from one of the extensions to the other of the extensions;
   wherein the extensions have distal ends spaced from the main panel, the extensions extending in a common direction from the main panel to the distal ends and the impact panel extends from the distal end of one of the extensions to the distal end of the other of the extensions.

2. The airbag of claim 1, wherein one of the perimeter surfaces has a first portion and the other of the perimeter surfaces has a second portion, the first portion and the second portion facing each other, and the impact panel extends from the first portion to the second portion.

3. The airbag of claim 1, wherein one of the perimeter surfaces has a first portion and the other of the perimeter surfaces has a second portion, the first portion and the second portion facing each other, and a length of the impact panel is greater than a distance from the first portion to the second portion.

4. The airbag of claim 1, wherein the impact panel has a coefficient of friction that is greater than a coefficient of friction of the main panel.

5. The airbag of claim 4, wherein the impact panel and the main panel are each a fabric each having a weave pattern, wherein the coefficients of friction of the impact panel and the main panel are defined by at least the weave patterns of the fabrics, and wherein the weave pattern of the fabric of the impact panel is different than the weave pattern of the fabric of the main panel.

6. The airbag of claim 1, further comprising a first tether and a second tether each in the inflation chamber, the first tether connected to one of the extensions, and the second tether connected to the other of the extensions.

7. The airbag of claim 1, wherein a diameter of each extension through the perimeter surface is less than a diameter of the main panel.

8. The airbag of claim 1, wherein each extension is in fluid communication with the inflation chamber.

9. The airbag assembly of claim 1, wherein each extension extends between and terminates at an upper end and a lower end, and the impact panel extends continuously from the upper end to the lower end.

10. An airbag assembly comprising:
a housing;
an airbag supported by the housing, the airbag including a main panel defining an inflation chamber being inflatable to an inflated position;
the airbag including a pair of extensions spaced from each other, each extension having a perimeter surface, the entire perimeter surface extending transversely from the main panel on the perimeter of the extension;
the airbag including an impact panel external to the inflation chamber, the impact panel spaced from the main panel in the inflated position and extending from one of the extensions to the other of the extensions;
an inflator in communication with the inflation chamber; and
a first tether and a second tether each in the inflation chamber, the first tether extending from the housing to one of the extensions and the second tether extending from the housing to the other of the extensions;
wherein the airbag extends in a first direction from the housing to the main panel and wherein the extensions extend from the main panel in the first direction.

11. The airbag assembly of claim 10, wherein the extensions have distal ends spaced from the main panel, the extensions extending from the main panel to the distal ends in the first direction and the impact panel extends from the distal end of one of the extensions to the distal end of the other of the extensions.

12. The airbag assembly of claim 10, wherein one of the perimeter surfaces has a first portion and the other of the perimeter surfaces has a second portion, the first portion and the second portion facing each other, and the impact panel extends from the first portion to the second portion.

13. The airbag assembly of claim 10, wherein one of the perimeter surfaces has a first portion and the other of the perimeter surfaces has a second portion, the first portion and the second portion facing each other, and a length of the impact panel is greater than a distance from the first portion to the second portion.

14. The airbag assembly of claim 10, wherein the impact panel has a coefficient of friction that is greater than a coefficient of friction of the main panel.

15. The airbag assembly of claim 14, wherein the impact panel and the main panel are each a fabric, wherein the fabric of the impact panel has a weave pattern and the coefficient of friction of the impact panel and the main panel are defined by at least the weave pattern, and wherein the fabric of the main panel has a weave pattern different than the weave pattern of the impact panel.

16. The airbag assembly of claim 10, wherein a diameter of the extensions through the perimeter surfaces is less than a diameter of the main panel.

17. The airbag assembly of claim 10, wherein each extension extends between and terminates at an upper end and a lower end, and the impact panel extends continuously from the upper end to the lower end.

18. An airbag assembly comprising:
a housing;
an airbag supported by the housing, the airbag including a main panel defining an inflation chamber being inflatable to an inflated position;
the airbag including a pair of extensions spaced from each other, each extension having a perimeter surface, the entire perimeter surface extending transversely from the main panel on the perimeter of the extension;
the airbag including an impact panel external to the inflation chamber, the impact panel spaced from the main panel in the inflated position and extending from one of the extensions to the other of the extensions; and
an inflator in communication with the inflation chamber.

19. The airbag assembly of claim 18, wherein each extension extends between and terminates at an upper end and a lower end, and the impact panel extends continuously from the upper end to the lower end.

* * * * *